(12) United States Patent
Li et al.

(10) Patent No.: US 11,489,375 B2
(45) Date of Patent: Nov. 1, 2022

(54) SINGLE PHASE PERMANENT MAGNET MOTOR

(71) Applicant: Johnson Electric S.A., Murten (CH)

(72) Inventors: Yue Li, Hong Kong (CN); Tao Zhang, Shenzhen (CN); Jie Chai, Shenzhen (CN); Chiu You Zhou, Shenzhen (CN); Qiang Zhou, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 899 days.

(21) Appl. No.: 15/369,135

(22) Filed: Dec. 5, 2016

(65) Prior Publication Data
US 2017/0163104 A1 Jun. 8, 2017

(30) Foreign Application Priority Data
Dec. 3, 2015 (CN) .......................... 201510882236.7

(51) Int. Cl.
| H02K 1/2706 | (2022.01) |
| H02K 1/14 | (2006.01) |
| H02K 3/18 | (2006.01) |
| H02K 21/16 | (2006.01) |
| H02K 29/03 | (2006.01) |

(52) U.S. Cl.
CPC ............. *H02K 1/146* (2013.01); *H02K 1/148* (2013.01); *H02K 1/2706* (2013.01); *H02K 3/18* (2013.01); *H02K 21/16* (2013.01); *H02K 29/03* (2013.01)

(58) Field of Classification Search
CPC ........ H02K 1/146; H02K 1/2706; H02K 3/18; H02K 21/16; H02K 1/14; H02K 1/16; H02K 29/03; H02K 2201/03; H02K 1/148; H02K 1/165; H02K 1/2733; H02K 1/274

USPC ....... 310/216.072, 216.073, 216.074, 156.01
See application file for complete search history.

(56) References Cited

U.S. PATENT DOCUMENTS

| 3,643,118 A | * | 2/1972 | Ichiki | ................... H02K 1/146 310/40 R |
| 2010/0141059 A1 | * | 6/2010 | Nishimura | ............... H02K 1/02 310/44 |
| 2015/0042194 A1 | * | 2/2015 | Li | ......................... H02K 21/16 310/156.01 |
| 2016/0028296 A1 | * | 1/2016 | Kusase | .................. H02K 16/04 310/156.01 |

FOREIGN PATENT DOCUMENTS

| JP | S62177278 | 11/1987 |
| JP | H03273854 A | 12/1991 |

* cited by examiner

*Primary Examiner* — Bryan R Perez
(74) *Attorney, Agent, or Firm* — Muncy, Geissler, Olds & Lowe, P.C.

(57) ABSTRACT

A single phase permanent magnet motor includes a stator and a rotor. The stator includes a stator corer and windings. The stator corer includes a yoke portion and stator teeth. Each stator tooth includes a winding portion and a pole shoe connected to an end of the winding portion. Each pole shoe includes a pole face. The pole face defines a first positioning notch at a middle thereof. Each of the pole faces further defines at least one second positioning notch. Said at least one second positioning notches in one of pole shoe are located at the same side of the first positioning notch of the corresponding one pole shoe. The first and second positioning notches are configured such that an initial position of the rotor received in the space of the stator is offset from a dead point position.

15 Claims, 5 Drawing Sheets

SINGLE PHASE PERMANENT MAGNET MOTOR

CROSS REFERENCE TO RELATED APPLICATIONS

This non-provisional patent application claims priority under 35 U.S.C. § 119(a) from Patent Application No. 201510882236.7 filed in The People's Republic of China on Dec. 3, 2015.

FIELD OF THE INVENTION

This invention relates to the field of motors, and in particular, to a single phase permanent magnet motor.

BACKGROUND OF THE INVENTION

A magnetic lamination of a single phase permanent magnet motor in the art is usually of an integral structure, i.e., the magnetic lamination includes a yoke and teeth extending inwardly from the yoke, and the yoke and teeth are integrally formed as one piece. A large slot opening is formed between pole shoes of neighboring teeth. Due to the large slot opening, the motor has a large cogging torque and thus generates vibration and noise. Further, the constraint of the large slot opening results in a small startup angle and poor startup reliability.

SUMMARY OF THE INVENTION

Thus, there is a desire for a new single phase permanent magnet motor which can improve the startup reliability.

A single phase permanent magnet motor is provided which includes a stator and a rotor. The stator includes a stator core and windings wound around the stator core. The stator core includes a yoke piece and a plurality of stator teeth. Each of the stator teeth includes a winding portion and a pole shoe connected to an end of the winding portion. The windings are wound around corresponding winding portions. The pole shoes extend along a circumferential direction of the motor and cooperatively define a space. Each pole shoe includes an arc-shaped pole face facing the rotor. The rotor is rotatably received in the space. An air gap is defined between an outer circumferential surface of rotor and the pole faces of the pole shoes. Each pole shoe defines a first positioning notch and a second positioning notch. The first and second positioning notches are configured such that an initial position of the rotor received in the space of the stator is offset from a dead point position.

Preferably, the first positioning notch has a greater projected area on a plane perpendicular to an axis of the motor than a projected area of the second positioning notch on a plane perpendicular to an axis of the motor.

Preferably, the first positioning notches are located at or close to a radially central line of the corresponding winding portions.

Preferably, each of the pole shoes defines more than one the second positioning notches, one of two neighboring second positioning notches close to the corresponding first positioning notch has a greater projected area on a plane perpendicular to an axis of the motor than a projected area of the other second positioning notch away from the first positioning notch on a plane perpendicular to an axis of the motor.

Preferably, the winding portion of each stator tooth forms a connecting portion at an end away from the pole shoe of the stator tooth, the yoke portion defines a plurality of locking grooves in an inner side thereof to operatively engage with the connecting portions of the corresponding stator teeth.

Preferably, the first positioning notches and the second positioning notches are defined in the pole faces of the corresponding pole shoes.

Preferably, a slot opening is defined between pole shoes of neighbouring stator teeth, a circumferential width of the slot opening is denoted by "a", a circumferential width of each first positioning notch is denoted by "b1", and a radial width of the air gap is denoted by "c", wherein 3a<b1<6c.

Preferably, c<a<3c.

Preferably, a circumferential width of one of said at least one second positioning notch in one of the pole shoes adjacent to the first positioning notch in the corresponding pole shoe is denoted by "b2", wherein 2a<b2<b1.

Preferably, an angle α is formed between a line connecting the second positioning notch of one of the pole shoes adjacent to the first positioning notch of the corresponding one pole shoe and a center of the motor and a line connecting circumferentially central point of the slot opening adjacent to the second positioning notch and the center of the motor, wherein the angle α is greater than 15 degrees and less than 35 degrees.

Preferably, the pole faces of the stator core are located on a same cylindrical surface which has an axis coinciding with that of the rotor.

Preferably, the first positioning notches and the second positioning notches are defined in the corresponding pole shoes away from the pole face.

Preferably, neighboring pole shoes are connected through a magnetic bridge.

The single phase permanent magnet motor of the present invention defines the first positioning notch in the middle of the pole shoe of the tooth of the stator and defines at least one second positioning notch in the pole shoe at the same side of the first positioning notch, such that the rotor of the single phase permanent magnet motor can avoid the dead point position at startup thereof, thereby improving the startup reliability.

Figure 1:
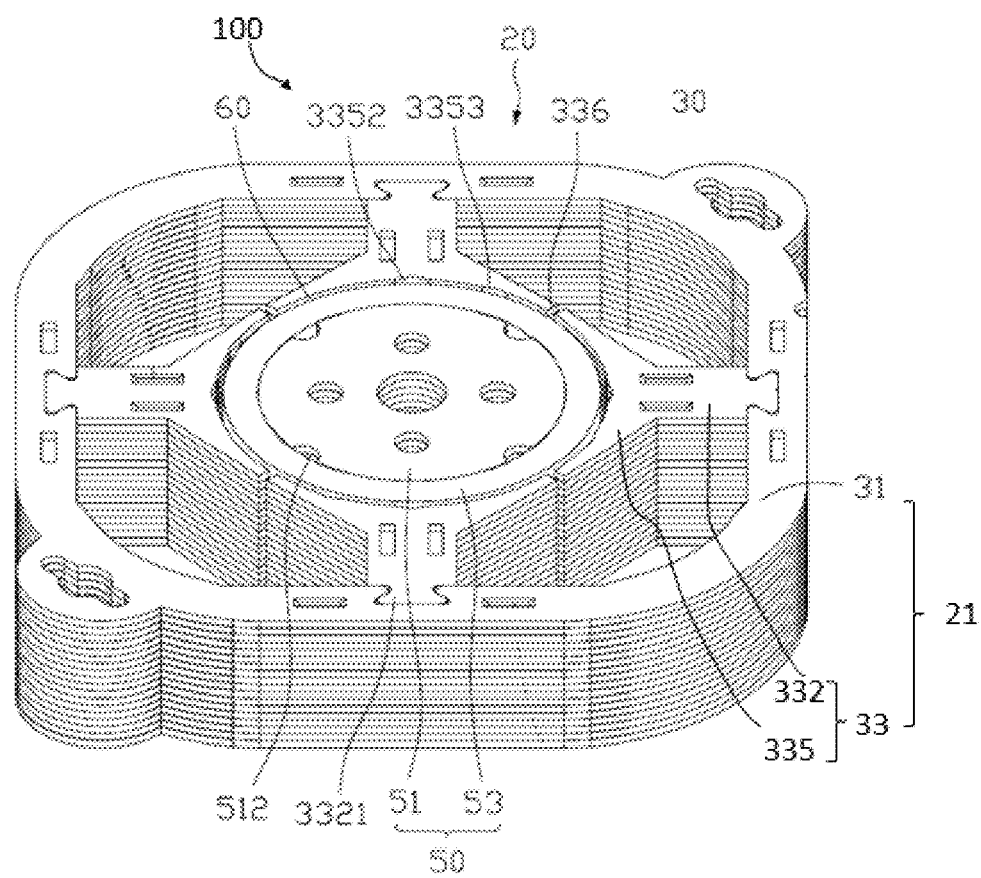
FIG. 1 is a perspective view of a stator and a rotor according to a first embodiment of the present invention.

Description of reference numerals of main components

DETAILED DESCRIPTION OF THE EMBODIMENTS

The technical solutions of the embodiments of the present invention will be clearly and completely described as follows with reference to the accompanying drawings. Apparently, the embodiments as described below are merely part of, rather than all, embodiments of the present invention. Based on the embodiments of the present disclosure, any other embodiment obtained by a person skilled in the art without paying any creative effort shall fall within the protection scope of the present invention.

It is noted that, when a component is described to be "fixed" to another component, it can be directly fixed to another component or there may be an intermediate component. When a component is described to be "connected" to another component, it can be directly connected to another component or there may be an intermediate component. When a component is described to be "disposed" on another component, it can be directly disposed on another component or there may be an intermediate component.

Unless otherwise specified, all technical and scientific terms have the ordinary meaning as understood by people skilled in the art. The terms used in this disclosure are illustrative rather than limiting.

Technical solutions and advantages of the present invention will become apparent by consideration of the following description of embodiments of the present invention with reference to the accompanying drawings. The drawings are only for reference and illustration, and should not be regarded as limiting. Dimensions of components and features shown in the drawings are generally chosen for convenience and clarity of presentation and are not necessarily shown to scale.

Referring to FIG. 1, a motor 100 according to an embodiment of the present invention includes a stator 20 and a rotor 50 rotatable relative to the stator 20. In this embodiment, the motor 100 is a single phase BLDC (brushless direct current) motor. The stator 20 includes a stator core 21, and end covers (not shown) positioned at two ends of the stator core 21. The rotor 50 is rotatably received in the stator 20. Two ends of a rotary shaft fixed to the rotor 50 are mounted to the end covers through bearings.

The stator 20 further includes an insulating bracket and windings (not shown). The insulating bracket is mounted on the stator core 21. The windings are wound around the insulating bracket. The stator core 21 and the windings are separated from each other by the insulating bracket, thus obtaining insulation therebetween.

The stator core 21 includes a yoke portion 31 and plurality of stator teeth 33. In this embodiment, the stator core 21 is of a four-slot type, i.e. the stator core 21 includes four stator teeth 33. The yoke portion 31 is generally annular, and defines a plurality of locking grooves 312 in the inner side of the yoke portion 31. Each of the stator teeth 33 includes a wingding portion 332 and a pole shoe 335. In this embodiment, the winding portion 332 is generally rectangular, and an end thereof away from the corresponding pole shoe 335 forms a connecting portion 3321. The connecting portion 3321 engages in the corresponding locking groove 312, such that the stator tooth 33 is connected to the yoke portion 31.

Figure 2:
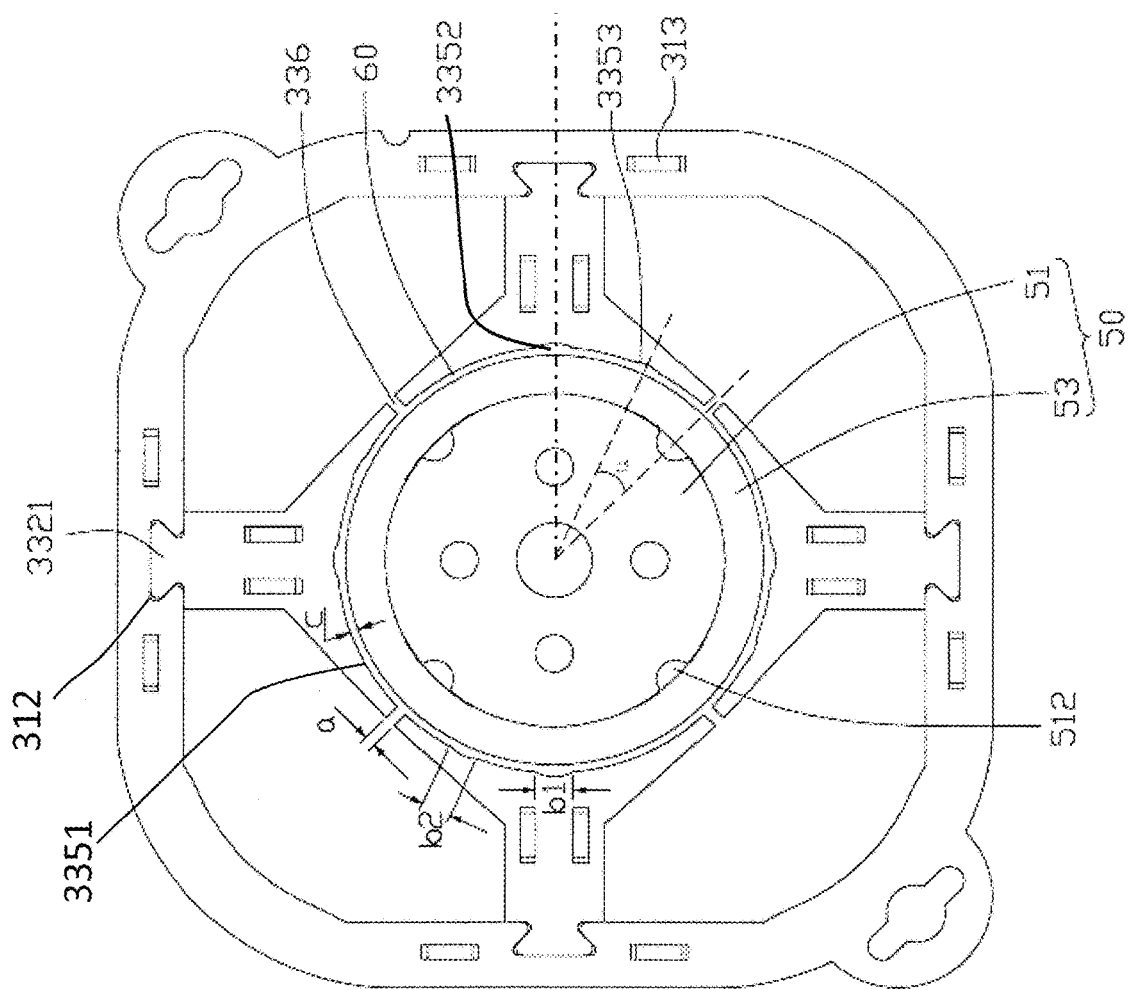
FIG. 2 is a top plan view of the stator and the rotor of FIG. 1.
Figure 3:
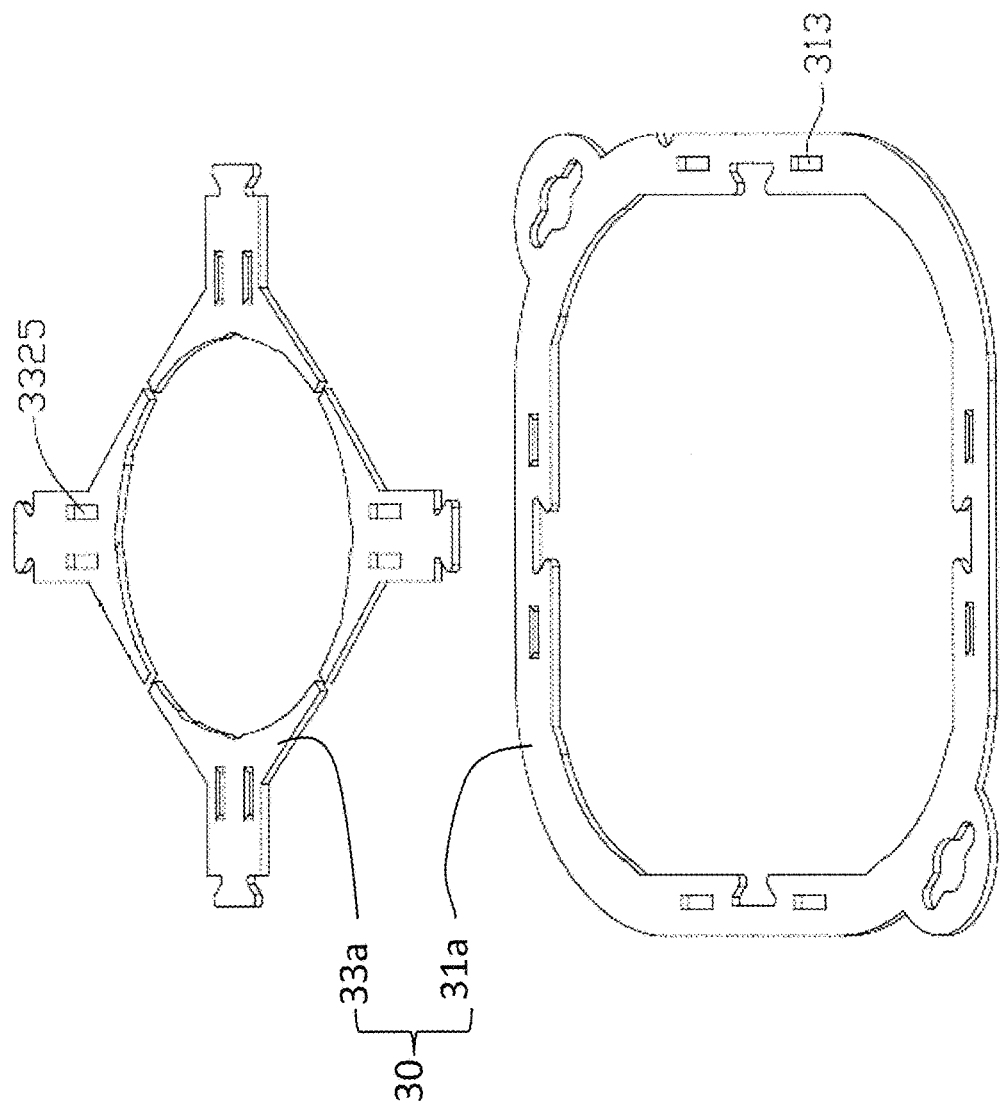
FIG. 3 is an exploded view of a stator core of FIG. 1.
Figure 4:
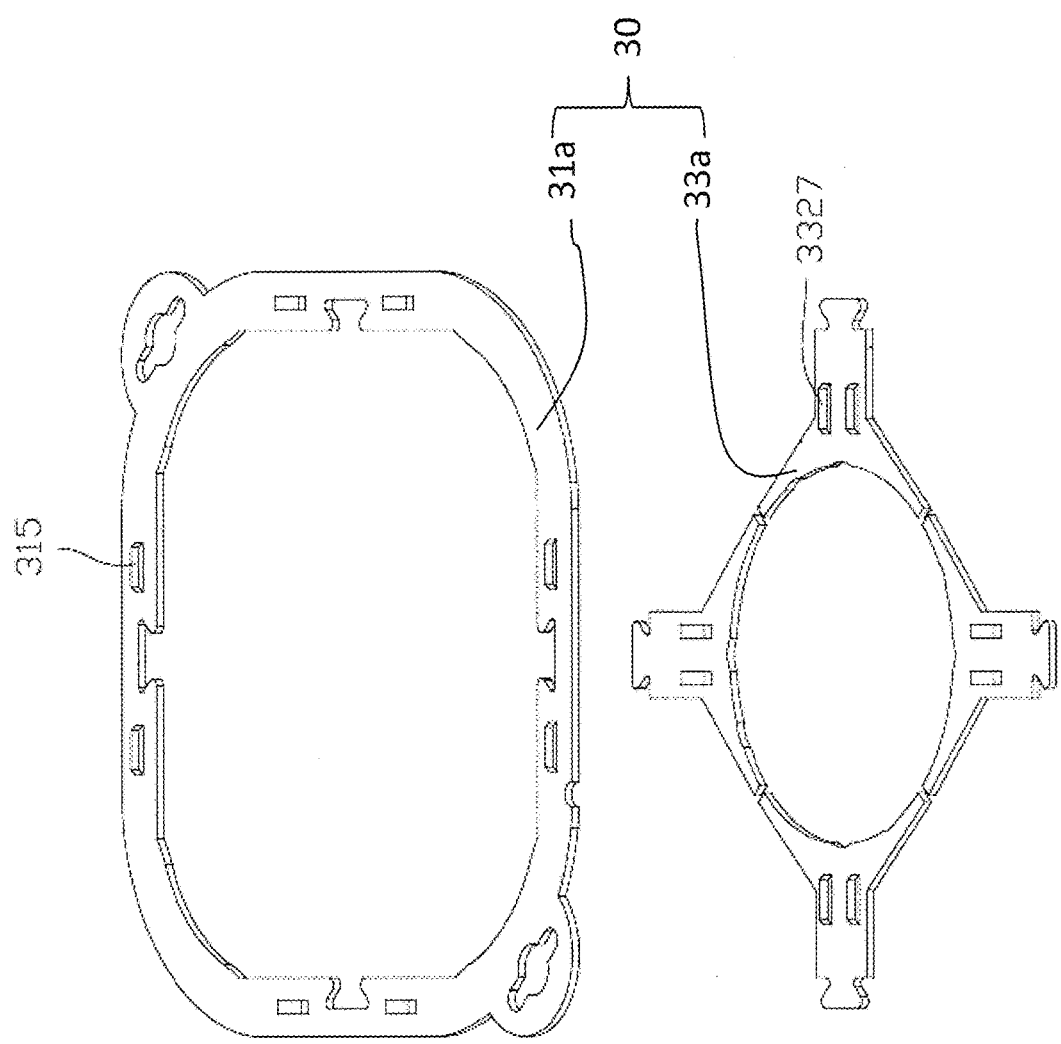
FIG. 4 is an exploded view of the stator core of FIG. 3, viewed from another aspect.

Referring to FIG. 2-4, in this embodiment, the stator core 21 is formed by stacking a plurality of magnetic laminations 30 along an axial direction of the motor 100. The magnetic laminations 30 are made of a soft magnetic material with high magnetic conductivity, such as silicon steel sheets. Each of the magnetic laminations 30 includes a yoke piece 31a and a plurality of tooth piece 33a. In assembly, the yoke pieces 31 of the magnetic laminations 30 are laminated to form the yoke portion 31 of the stator core 21. The tooth pieces 33a of the laminations 30 are laminated to form a plurality of the stator teeth 33 of the stator core 21. It should be understood that each lamination 30 of the embodiment are split-type lamination, therefore, the yoke portion 31 and the stator teeth 33 can be separatively constructed and then assembled together to form the stator core 21. The use of split-type laminations facilitates winging of the windings of the stator 20. In another embodiment, the teeth piece 33a and the yoke piece 31a of each lamination 30 are integrally formed.

Each of the yoke pieces 31a includes a top face and a bottom face (not labeled) opposite to the top face. In this embodiment, the top face and the bottom face are perpendicular to the axial direction of the motor 100. Each yoke piece 31a forms a plurality of first positioning portions 313, which concaves towards the bottom face of the yoke piece 31a, and thus forms a first locking portion 315 at the bottom face of the yoke piece 31a. In assembling, the first locking portions 315 of one of two neighboring magnetic laminations 30 respectively engage in the first positioning portions 313 of the other one of the two neighboring magnetic laminations 30, such that the yoke pieces 31a of the neighboring magnetic laminations 30 cannot move relative to each other radially and circumferentially. It should be understood that the first positioning portions 313 and the first locking portions 315 can be formed by stamping. Each teeth piece 33a includes a first side face and a second side face opposite to the first side face (not labeled). In this embodiment, the first side face and the second side face are perpendicular to an axial direction of the motor 100. Each teeth piece 33a forms at least one second positioning portion 3325. Each of the at least one second positioning portion 3325 concaves towards the second side face of the winding portion 332, and thus forms a second locking portion 3327 at the second side face of the winding portion 332. In assembling, the second locking portion 3327 of one of two stacked teeth piece 33a engages in the corresponding second positioning portion 3325 of the other one of the two teeth piece 33a, such that the two stacked teeth piece 33a cannot move relative to each other radially and circumferentially.

In this embodiment, each pole shoe 335 includes an arc-shaped pole face 3351 facing the rotor 50. An arc length of the arc-shaped pole face 3351 is close to one-quarter of a circle on which the pole face 3351 is located. The pole shoe 335 defines a first positioning notch 3352 and one or more second positioning notches 3353. Preferably, the first positioning notch 3352 is located at or closed to a radially central line of the corresponding the winding portion 332. The one or more second positioning notches 3353 are located at the same circumferential side of the first positioning notch 3352. The first positioning notch 3352 has a greater projected on a plane perpendicular to an axis of the motor 100 than a projected area of each of the second positioning notches 3353 on a plane perpendicular to an axis of the motor 100. If each stator tooth 33 includes more than one second positioning notches 3353, one of two neighboring second positioning notches 3353 close to the corresponding first positioning notch 3352 has a greater projected area on a plane perpendicular to the axis of the motor 100 than that of the other second positioning notch 3353 away from the first positioning notch 3352. The first positioning notches 3352 and the second positioning notches 3353 can be arc-shaped or rectangular-shaped.

The rotor 50 includes a rotor core 51 and a permanent magnet 53. The permanent magnet 53 forms a plurality of magnetic poles. In this embodiment, the rotary shaft (not shown) axially extends through a center of the rotor core 51 and is fixed to the rotor core 51. An outer circumferential surface of the rotor core 51 defines a plurality of axially-extending recesses 512. Each of the recesses 512 is located at a boundary of two neighboring magnetic poles to reduce magnetic flux leakage. In this embodiment, the permanent magnet 53 is an annular permanent magnet, which is mounted around the rotor core 51. The rotor 50 is rotatably received in the space of the stator 20, and an air gap 60 is defined between an outer circumferential surface of the permanent magnet 53 and the pole shoes 335 so that the rotor 50 is rotatable relative to the stator 20.

In this embodiment, the axis of the rotor 50 coincides with that of the stator 20, such that the air gap 60 is even. In particular, minimum distances between the outer circumferential surface of the permanent magnet 53 and the pole faces 3351 of the pole shoes 335 are the same.

In assembly, the four pole faces 3351 of the four pole shoes 335 cooperatively form a circle, with slot openings 336 being formed between the pole shoes 335 of neighboring stator teeth 33. Preferably, each slot opening 336 is located at a middle way of two neighboring winding portions 332 (i.e. the distances from the slot opening 336 between two neighboring stator teeth 33 to the radially central line of the winding portions 332 of the two stator teeth 33 are the same). Alternately, the slot opening 336 can deviate slightly from the middle way of the two neighboring winding portions 332.

Please referring to FIG. 2, for more clear description of dimensional relationship among the first positioning notch 3352, the second positioning notch 3353, the slot opening 336, and the air gap 60, a circumferential width of the slot opening 336 is denoted by "a", a circumferential width of the first positioning notch 3352 is denoted by "b1", a circumferential width of the second positioning notch 3353 is denoted by "b2", and a radial width of the air gap 60 is denoted by "c". In one embodiment of present invention, "a", "b1", "b2", and "c" satisfies following relations: $3a<b1<6c$, $2a<b2<b1$, and $c<a<3c$, i.e. the circumferential width of the first positioning notch 3352 is greater than three times of the circumferential width of the slot opening 336 and less than six times of the radial width of the air gap 60; the circumferential width of the second positioning notch 3353 is greater than two times of the circumferential width of the slot opening 336 and less than the circumferential width of the first positioning notch 3352; the circumferential width of the slot opening 336 is greater than the radial width of the air gap 60 and less than three times of the width of the air gap 60. An angle α is formed between a line connecting the second positioning notch 3353 adjacent to the first positioning notch 3352 and a center of the stator core 21 and a line connecting a circumferentially central point of the slot opening 336 closed to the second positioning notch 3353 and the center of the stator core 21. The angle α is greater than 15 degrees and less than 35 degrees.

In present embodiment, when the rotor is at an initial position, i.e. when the windings of the stator is not energized, a neutral region at the boundary of neighboring magnetic poles of the rotor 50 is located between the first positioning notch 3352 and the adjacent second positioning notch 3353. Thus, a startup angle is less than 90 degrees electric angle. The rotor 50 of the motor 100 is easy to achieve unidirectional startup. As viewed from FIG. 2, the rotor 50 is easy to start along a counter-clockwise direction.

It should be understood that the stator core 21 of the present motor 100 can also use integral laminations, i.e. the teeth piece 33a and the yoke piece 31a cannot be split apart. The use of split-type laminations facilitates winging of the windings of the stator 20.

It should be understood that, the first positioning notches 3352 and the second positioning notches 3353 can be through grooves continuously axially extending through the corresponding pole shoes 335 or discontinuous grooves that extend discontinuously. Each of the first positioning notches 3352 and the second positioning notches 3353 may extend along a direction parallel to the axial direction of the motor 100 or extend obliquely relative to the axial direction of the motor.

Figure 5:
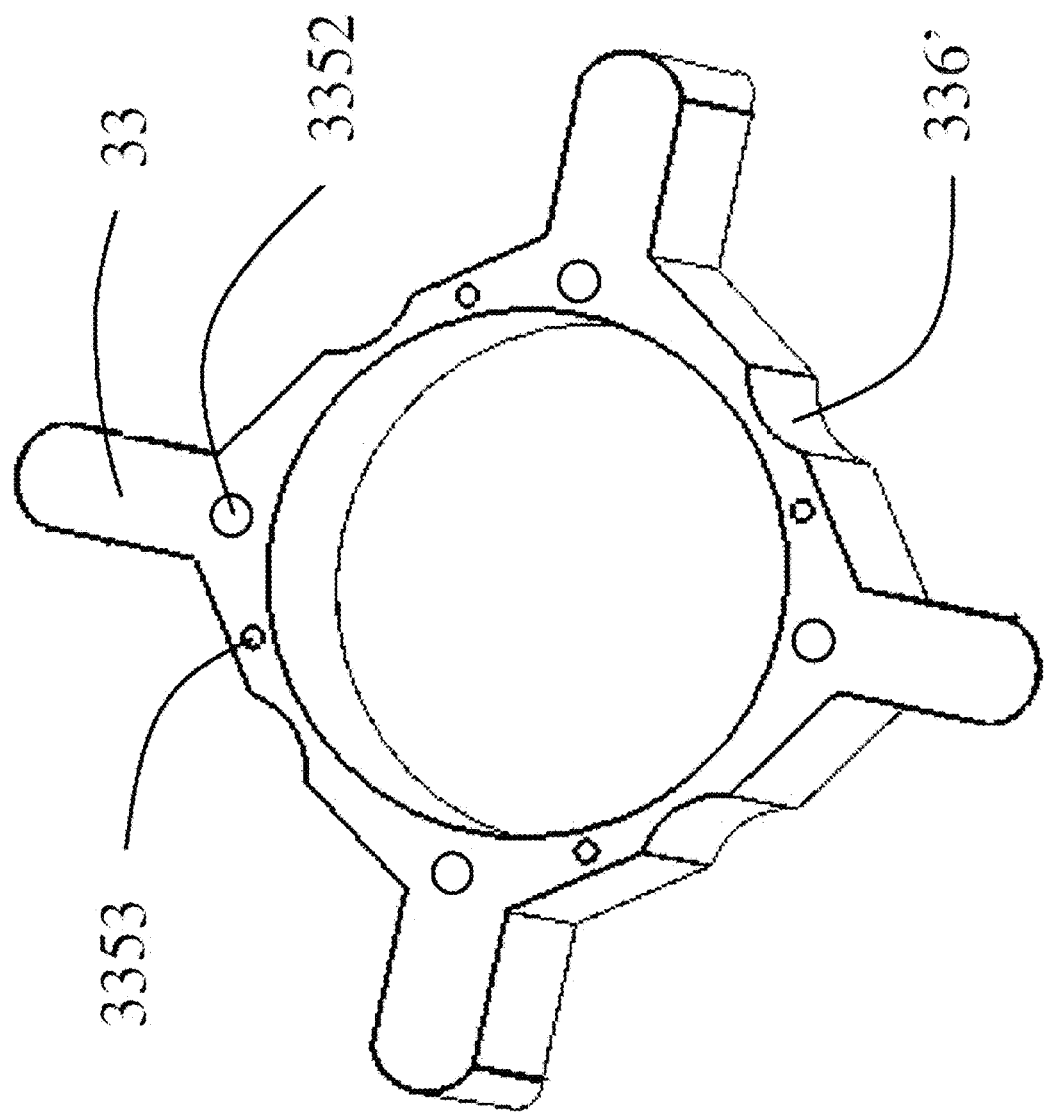
FIG. 5 is a schematic view of the stator core according to an alternative embodiment.

Referring to FIG. 5, in another embodiment, the first positioning notches 3352 and the second positioning notches 3353 are defined in the corresponding pole shoes 335 away from the pole face 3351. The pole shoes 335 of neighboring stator teeth 33 are connected to each other through a magnetic bridge 336' with large magnetic reluctance (for example, an area of a cross section of the pole shoe 335 at the magnetic bridge decreases sharply so that the magnetic reluctance increases sharply). The first positioning notches 3352 and the second positioning notches 3353 are configured such that an initial position of the rotor received in the space of the stator is offset from a dead point position. The dead point position is a position where the torque on the rotor is zero when the winding of the stator is energized.

The embodiments described above are preferred embodiments of the present invention, and should not limit the scope of the present invention in any way. For example, besides the stacking arrangement of the laminations as described above, the stator core can also be manufactured by powder metallurgy to form integrally the yoke piece and stator teeth. In addition, various other modifications can be apparent to persons skilled in the field without departing from the scope of the invention, and all of such modifications should fall within the scope of the present invention.

The invention claimed is:

1. A single phase permanent magnet motor, comprising:
   a stator comprising a stator core and windings wound around the stator core, the stator core comprising a yoke portion and a plurality of stator teeth, each of the stator teeth comprising a winding portion and a pole shoe connected to an end of the winding portion, the windings being wound around corresponding winding portions, the pole shoes extending along a circumferential direction of the motor and cooperatively defining a space therebetween; and
   a rotor rotatably received in the space, the rotor comprising a rotor core and a permanent magnet attached to the rotor core, each pole shoe comprising an arc-shaped pole face facing the rotor, an air gap is defined between an outer circumferential surface of rotor and the pole faces of the pole shoes;
   wherein each of the pole shoes defines a first positioning notch and at least one second positioning notch, the first and second positioning notches are configured such that an initial position of the rotor received in the space of the stator is offset from a dead point position.

2. The single phase permanent magnet motor of claim 1, wherein the first positioning notches and the second positioning notches are defined in the pole faces of the corresponding pole shoes.

3. The single phase permanent magnet motor of claim 2, wherein a slot opening is defined between pole shoes of neighbouring stator teeth, a circumferential width of the slot opening is denoted by "a", a circumferential width of each first positioning notch is denoted by "b1", and a radial width of the air gap is denoted by "c", wherein $3a<b1<6c$.

4. The single phase permanent magnet motor of claim 3, wherein $c<a<3c$.

5. The single phase permanent magnet motor of claim 4, wherein a circumferential width of one of said at least one second positioning notch in one of the pole shoes adjacent to the first positioning notch in the corresponding pole shoe is denoted by "b2", wherein $2a<b2<b1$.

6. The single phase permanent magnet motor of claim 3, wherein an angle α is formed between a line connecting the second positioning notch of one of the pole shoes adjacent to the first positioning notch of the corresponding one pole shoe and a center of the motor and a line connecting circumferentially central point of the slot opening adjacent to the second positioning notch and the center of the motor, wherein the angle α is greater than 15 degrees and less than 35 degrees.

7. The single phase permanent magnet motor of claim 2, wherein the pole faces of the stator core are located on a same cylindrical surface which has an axis coinciding with that of the rotor.

8. The single phase permanent magnet motor of claim 1, wherein the permanent magnet is an annular permanent magnet mounted around the rotor core, the an air gap is defined between an outer circumferential surface of the permanent magnet and the pole shoes.

9. The single phase permanent magnet motor of claim 8, wherein the permanent magnet forms a plurality of magnetic poles, an outer circumferential surface of the rotor core defines a plurality of axially-extending recesses, each of the recesses is located at a boundary of two neighboring magnetic poles.

10. The single phase permanent magnet motor of claim 1, wherein the first positioning notch is located at or close to a radially central line of the corresponding winding portion.

11. The single phase permanent magnet motor of claim 10, wherein each of the pole shoes defines more than one the second positioning notches, one of two neighbouring second positioning notches close to the corresponding first positioning notch has a greater projected area on a plane perpendicular to an axis of the motor than a projected area of the other second positioning notch away from the first positioning notch on a plane perpendicular to an axis of the motor.

12. The single phase permanent magnet motor of claim 1, wherein the first positioning notch has a greater projected area on a plane perpendicular to an axis of the motor than a projected area of the second positioning notch on a plane perpendicular to an axis of the motor.

13. The single phase permanent magnet motor of claim 1, wherein the winding portion of each stator tooth forms a connecting portion at an end away from the pole shoe of the stator tooth, the yoke portion defines a plurality of locking grooves in an inner side thereof to operatively engage with the connecting portions of the corresponding stator teeth.

14. The single phase permanent magnet motor of claim 1, wherein the first positioning notches and the second positioning notches are defined in the corresponding pole shoes away from the pole face.

15. The single phase permanent magnet motor of claim 1, wherein neighbouring pole shoes are connected through a magnetic bridge.

* * * * *